UNITED STATES PATENT OFFICE.

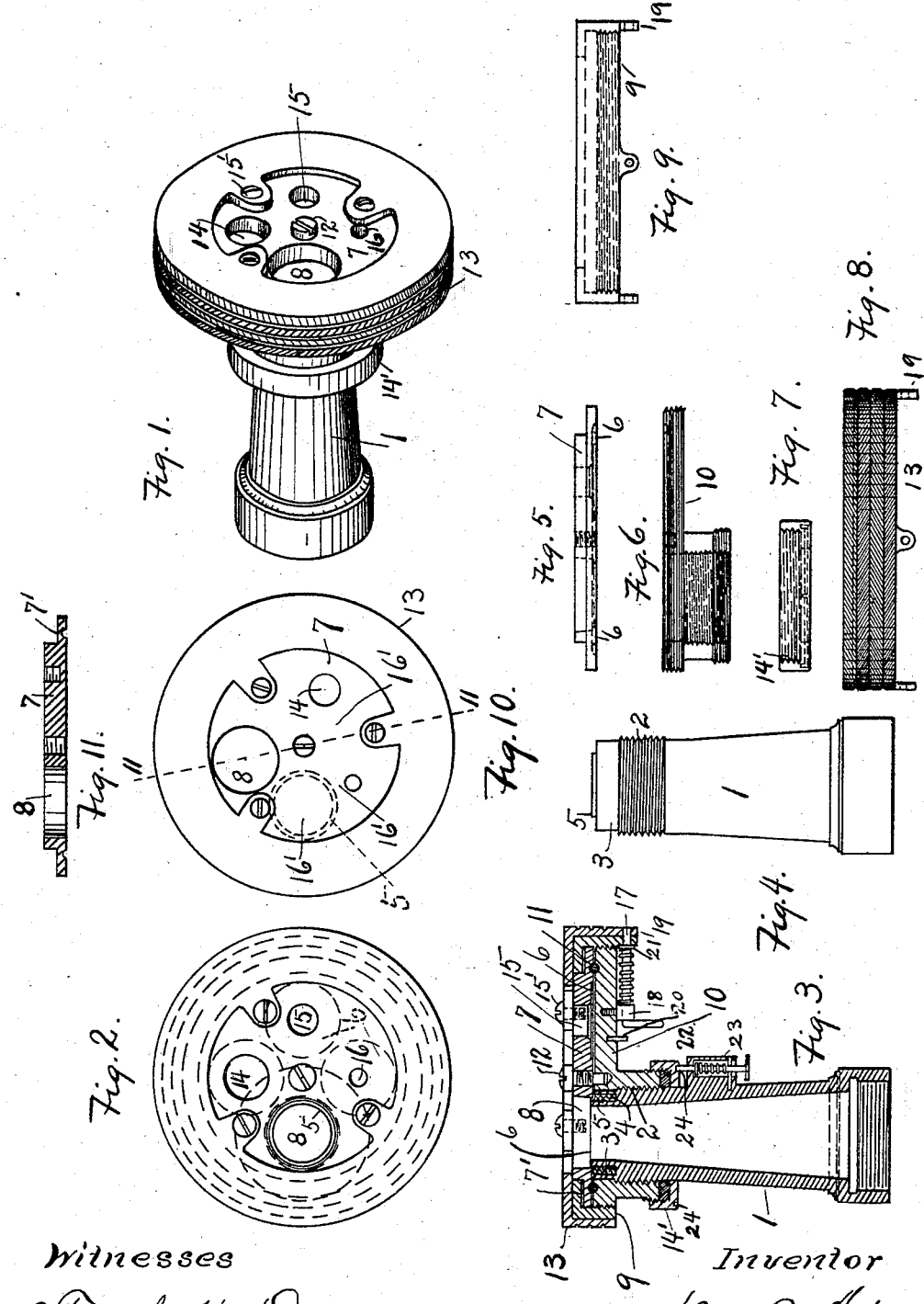

DON B. ADAMS, OF CHICAGO, ILLINOIS, ASSIGNOR OF ONE-HALF TO ROMULUS NEHEMIAH GRAHAM, OF FORT WORTH, TEXAS.

NOZZLE.

SPECIFICATION forming part of Letters Patent No. 578,706, dated March 16, 1897.

Application filed May 4, 1896. Serial No. 590,202. (No model.)

*To all whom it may concern:*

Be it known that I, DON B. ADAMS, a resident of Chicago, in the county of Cook and State of Illinois, have invented certain new and useful Improvements in Nozzles; and I do hereby declare the following to be a full, clear, and exact description of the invention, such as will enable others skilled in the art to which it pertains to make and use the same.

The invention relates to nozzles, and has for its object to increase the capacity and efficiency of such devices and insure certainty of action and convenience in adjustment and operation; and the invention consists in the construction hereinafter described and particularly pointed out.

In the accompanying drawings, Figure 1 is an isometric view of a nozzle. Fig. 2 is a front elevation. Fig. 3 is a longitudinal section. Fig. 4 is a side elevation of a pipe-section. Figs. 5 to 9, inclusive, are side elevations of details. Fig. 10 is a plan of a nozzle having but three discharge-openings, and Fig. 11 is a section of a plate on line 11 11 of Fig. 10.

Numeral 1 denotes a short pipe-section having a frusto-conical bore and adapted to be screwed upon another section or length of pipe. The pipe-section 1 is provided with external screw-threads 2, situated near its smaller end, but separated therefrom by a smooth portion 3. Within said part 3 is a groove or recess 4 to receive rubber or other packing. The inner wall 5 of said recess extends beyond the rest of the pipe-section and is adapted to enter and fit a countersunk recess 6 in a plate 7 and surrounding a passage 8 through said plate. This plate is held to the pipe so that its countersunk recess 6 fits the tubular wall 5, and it is also held against the rubber packing by a flanged ring 9, screwed onto a plate 10, having a socket or cylinder, whereby it is screwed onto the threaded part 2 of the pipe-section.

11 is an annular packing seated in suitable grooves in plate 7 and in a circular plate 10. Plate 7 rotates between the flanged ring 9 and said plate 10 about a pivot-screw 12. This screw is stepped in the top of the plate 10 at its center and at one side of the eccentric opening 8 therein. Said plate 10 also has an eccentric screw-threaded cylinder or socket, the bore of which is continuous with opening 8 and is adapted to be screwed at 2 upon the pipe-section 1. Said screw 12 extends through the plate 7 and has a smooth foot turning in a socket in the center of plate 10.

15' indicates screws to hold the milled ring 13 in fixed relation to the rotating plate 7.

The flange of the ring 13 is milled to fit it for manipulating the plate 7. Said plate has several openings, of which that marked 8 is one. 14, 15, and 16 denote others. Each opening is surrounded by a countersunk recess 6. The plate is rotated to bring any one of these openings to register with the pipe-conduit, as desired, the openings in the plate being of different sizes to provide for throwing different-sized streams.

The joint between the ring 10 and the pipe 1 is closed by a stuffing-box 14', which, together with the ring-packing 11 and the packing in recess 4, effectually prevents leaking. The stuffing-box and the packing-ring stop the escape of air and so coöperate with the packing in recess 4 to prevent any fluid escape between the pipe and plate 7. Said plate may be provided with imperforate portion 16' large enough to entirely close the pipe when desired, recesses 6 being omitted from plate 7, as indicated in Fig. 11.

17 denotes a spring locking-pin movable through a stud 18 and through an extension 19 of the milled flange of the ring 13 and adapted to enter a hole in said extension, with the effect to lock the ring 13 and flanged ring 9 together.

20 is a stop to prevent the entire withdrawal of the pin from its bearings. The spring 17 normally bears against stud 18 and against a collar 21 and tends to push the pin outward or to the position shown. 22 is a similar locking-pin having bearings in a housing 23, attached to pipe 1 and adapted when engaged with a hole 24 in the stuffing-box to hold the pipe and sleeved ring from rotation with respect to each other. The pipe-section being firmly held by its connections with the main lengths of pipe and the pin 22 engaged with one of the holes 24, the milled ring and plate 7 can be rotated without turning the stuffing-box or the sleeved ring which is connected therewith.

The plate 7 is supported slightly above the plate 10 by the annular packing 11 and the pipe extension 5, upon which latter the plate turns as upon a pivot. Said plate 7 is recessed at 7' to receive the ring 9. This recess is deep enough to leave a small space between the ring and plate, the friction being thereby diminished.

Having thus described my invention, what I claim is—

1. The combination of the pipe, the plate 10 provided with an eccentric socket, the perforated plate, the flanged ring, the milled ring connected to said latter plate, and a pivot secured to said plate and having a foot loosely stepped in the center of plate 10, the plate being fixed upon the pipe by means of its socket, substantially as described.

2. The combination of the pipe, the plate 10 provided with an eccentric socket, the perforated plate, the flanged ring, the milled ring connected to said latter plate, and a pivot secured to said plate and having a foot loosely stepped in the center of plate 10, the plate being fixed upon the pipe by means of its socket, and said pipe having an extension 5 fitting a countersunk recess 6 in the perforated plate, substantially as described.

3. The combination of the pipe, the plate 10 provided with an eccentric socket, the perforated plate, the flanged ring, the milled ring connected to said latter plate, and secured to said plate and having a foot loosely stepped in the center of plate 10, the plate being fixed upon the pipe by means of its socket, said pipe having an extension 5 fitting a countersunk recess 6 in the perforated plate, and a stuffing-box to close the joint between the pipe and the plate 10, a packing-ring between said plate and the perforated plate, and a packing seated in the end of the pipe also bearing against the perforated plate whereby the connections back of the latter packing are made air-tight, substantially as described.

4. In combination a pipe, a perforated plate rotatably mounted upon the end of the pipe, a flanged ring to hold the perforated plate upon the pipe, a plate 10 to hold the ring to the pipe and thereby hold the rotating perforated plate, an exterior operating-ring fixed to said perforated plate, and a locking device to lock the two rings and plate 10, substantially as described.

5. In combination a pipe, a perforated plate rotatably mounted upon the end of the pipe, a flanged ring to hold the perforated plate upon the pipe, a plate 10 to hold the ring to the pipe and thereby hold the rotating perforated plate, an exterior operating-ring fixed to said perforated plate, a stuffing-box 14' engaging a socket fixed to plate 10 and a locking device engaging the said box to lock it and the plate to the pipe, substantially as described.

In testimony whereof I have signed this specification in the presence of two subscribing witnesses.

DON B. ADAMS.

Witnesses:
 LOUIS GRUNDEIS,
 JAS. A. CLINTON.